United States Patent
Johnson

(12) 
(10) Patent No.: US 8,794,536 B2
(45) Date of Patent: Aug. 5, 2014

(54) MULTIPLE SUCTION CUP STORED-VALUE CARD FOR SECURING AN ELECTRONIC DEVICE ON A SURFACE

(71) Applicant: August A. Johnson, Boise, ID (US)

(72) Inventor: August A. Johnson, Boise, ID (US)

(*) Notice: Subject to any disclaimer, the term of this patent is extended or adjusted under 35 U.S.C. 154(b) by 0 days.

(21) Appl. No.: 13/924,247

(22) Filed: Jun. 21, 2013

(65) Prior Publication Data
US 2013/0341412 A1 Dec. 26, 2013

Related U.S. Application Data

(60) Provisional application No. 61/662,827, filed on Jun. 21, 2012.

(51) Int. Cl.
*G06K 19/00* (2006.01)
(52) U.S. Cl.
USPC .......................................... 235/492; 235/487
(58) Field of Classification Search
USPC ................................................ 235/487, 492
See application file for complete search history.

(56) References Cited

U.S. PATENT DOCUMENTS

| | | | |
|---|---|---|---|
| 6,375,143 B1* | 4/2002 | Burns | 248/363 |
| 2004/0195324 A1* | 10/2004 | Uchiyama et al. | 235/451 |
| 2008/0022566 A1* | 1/2008 | Busch et al. | 40/124 |

* cited by examiner

*Primary Examiner* — Matthew Mikels
(74) *Attorney, Agent, or Firm* — Pedersen and Company, PLLC; Ken J. Pedersen; Barbara S. Pedersen

(57) ABSTRACT

A mounting apparatus permits easy and quick attachment and removal of a portable electronic device to smooth surfaces for self-photos or videos, for example. A flat panel/card holds multiple, mini, double-sided suction cup units. One side of each cup unit may be connected to a portable electronic device such as a smart phone, or other lightweight digital media device with a smooth LCD or touch screen. The other side of each cup unit may be connected to a generally vertical surface or other object. The panel/card may be a single-layer plastic card with retention slots into which the double-sided suction cups are inserted. The panel/card may also function as a stored-value card, pre-paid gift card, or credit card incorporating bar codes, scratch-off codes, and magnetic strip features.

14 Claims, 11 Drawing Sheets

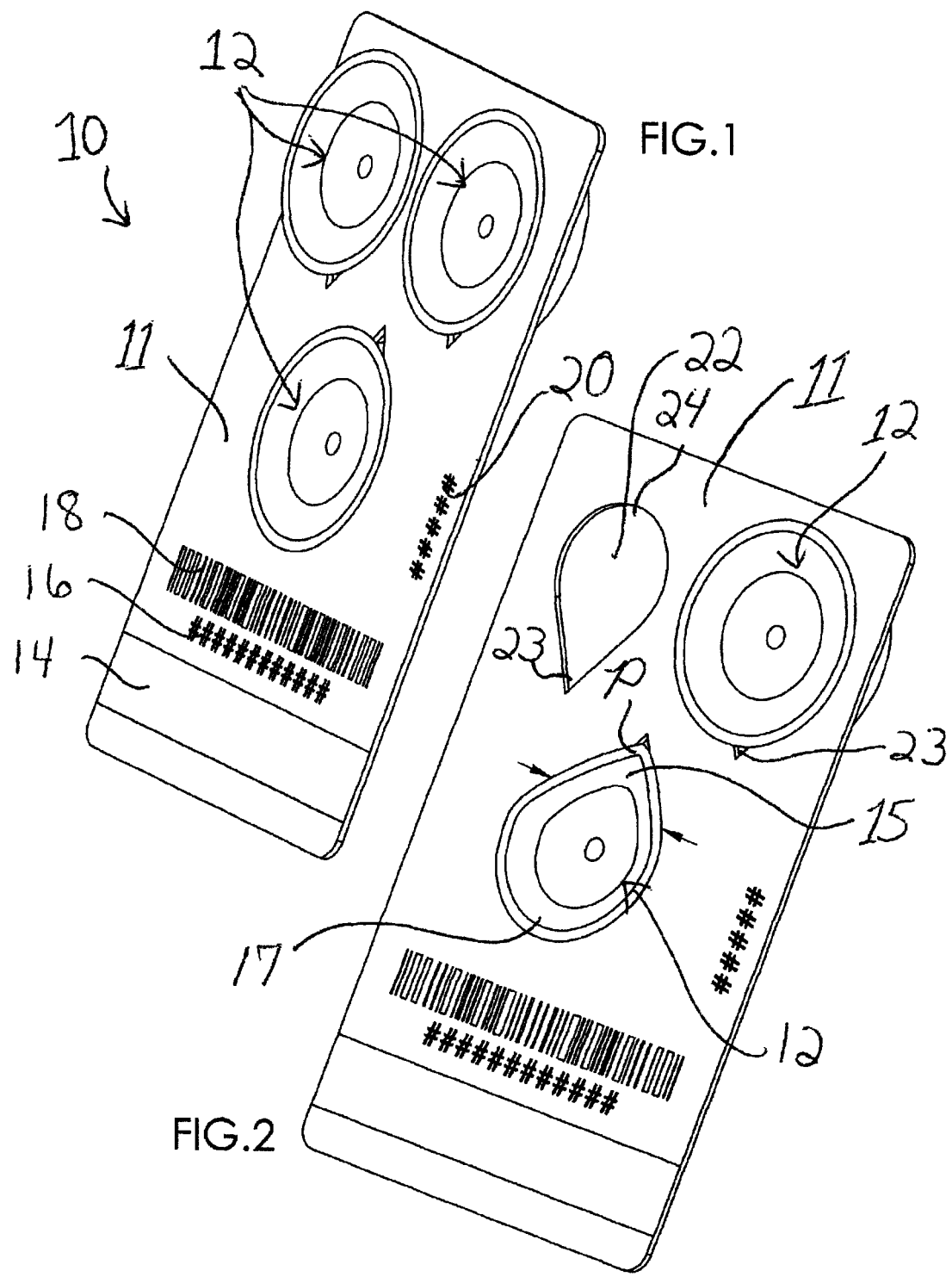

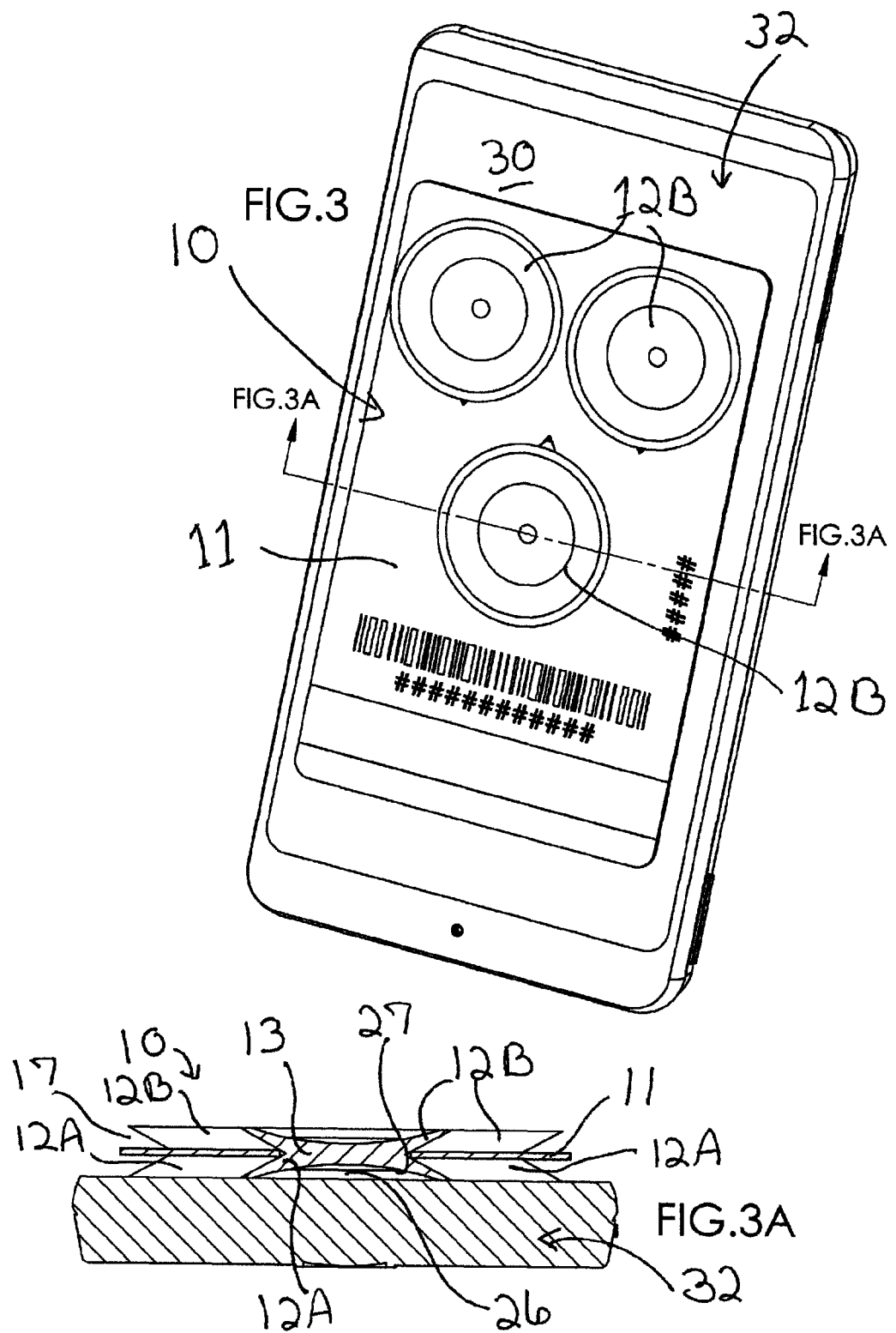

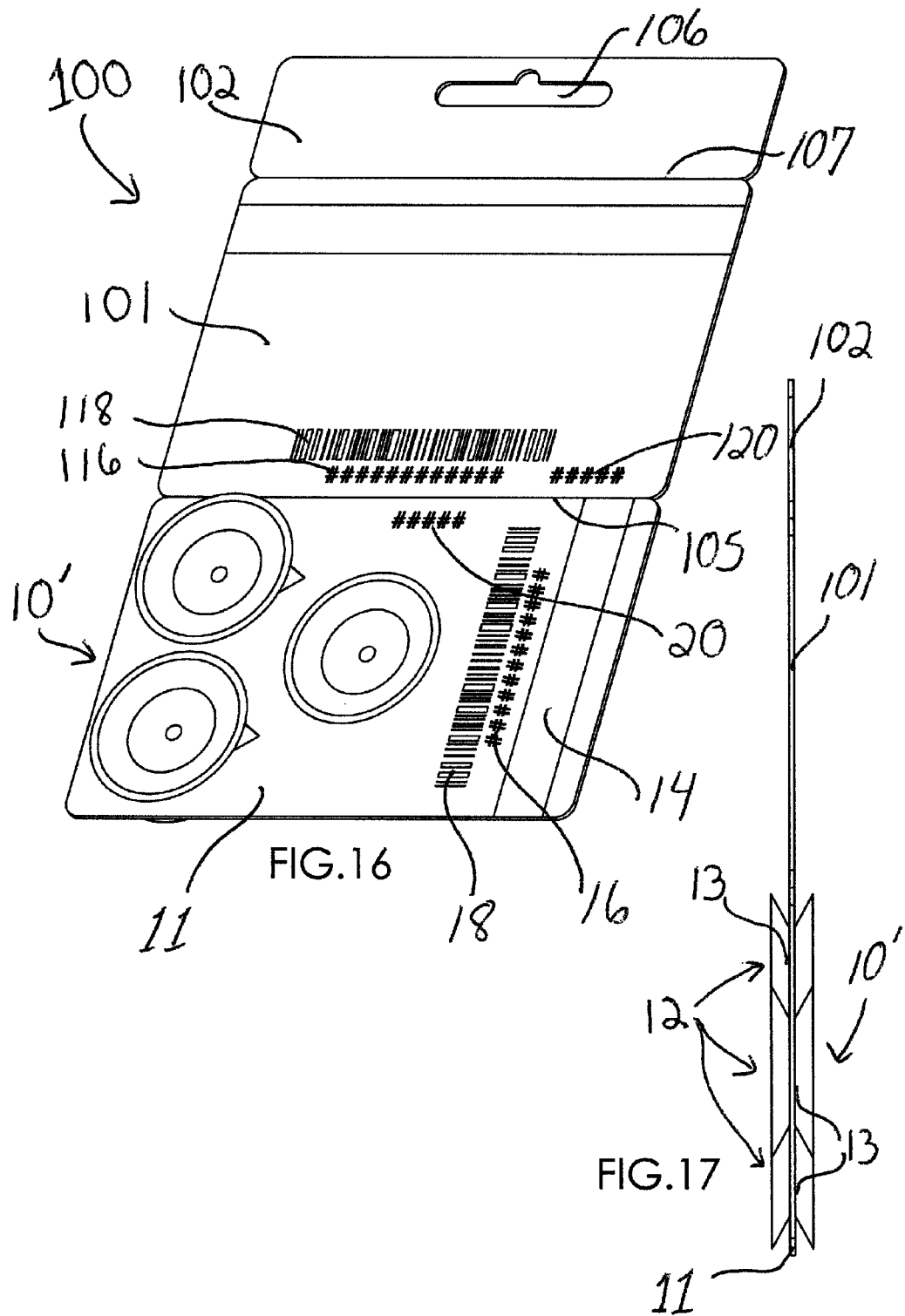

MULTIPLE SUCTION CUP STORED-VALUE CARD FOR SECURING AN ELECTRONIC DEVICE ON A SURFACE

This application claims benefit of Provisional Application Ser. No. 61/662,827, filed Jun. 21, 2012 and entitled "Multiple Suction Cup Stored-Value Card", the disclosure of which is incorporated by this reference.

BACKGROUND OF THE INVENTION

1. Field of the Invention

The present invention generally relates to a mounting accessory for electronic devices that have photo and video-recording capabilities. More specifically, the preferred embodiment is a mounting apparatus, for holding a portable electronic device, such as a cellular phone, smart phone, camera, or other digital media device, whereby the digital device may be connected to a surface or object preferably via suction cups, for hands-free use of the digital device. The mounting device preferably has dual functions in that it also provides additional functionality, for example, a financial, identification, advertising, or informational function. In especially-preferred embodiments, the mounting apparatus has the additional structure and function of a stored-value card, pre-paid gift card, or credit card, incorporating bar codes, scratch off codes, magnetic strip, and/or smart-chip features, for example.

2. Related Art

There are many electronic device holders, mounts, and attachment solution designs in the prior art. Still, there is an absence of a dual-purpose apparatus that may serve as a traditional stored-value or similar card but that also may serve as an attachment system that is operable with nearly all photo-capable cellular/smartphone designs. To the applicant's knowledge, there has not yet been disclosed a stored-value card with integrated double-suction-cups, that can hold a photo-capable cellular/smartphone in the desired methods for taking hands-free pictures and video.

With the development of information communication technology, cellular phones have become essential tools modern life. More recently, the cellular phone is provided with various functions, such as a camera, in addition to a function of simply calling or answering the telephone. The integrated camera has a variety of functions including photo and video recording. In addition, various smartphones have applications (known as "Apps") that allow a user to take photos using self-timers. These self-timers can be initiated either utilizing a preset time, motion sensor, or can be initiated by sound, such as a clapping noise or voice command. Alternatively, blue tooth enabled remote controls are becoming available to allow users to remotely control the shutter function, thereby providing more control when taking self-photos which is seemingly superior to alternative timer applications. Regardless, either format could be utilized for taking photos. Designs widely vary, however nearly all modern day smart-phone include a flat LCD touch screen, which the inventor has discovered can serve as a location at which to attach small suction cups. Thus, the cellular phone is recognized as advanced video-recording equipment, going beyond the functionality of a traditional camera used solely for picture taking purposes.

Stored-value cards (including gift cards) are well known. Stored-value cards are typically only pre-paid cards for purchasing goods or services either at retail locations or online. Prepaid cards are the fastest-growing non-cash payment method in the U.S. All prepaid cards begin their life when consumers load them with money. Then every time the card is used for payment, the transaction amount is deducted from the card's remaining balance. When the funds are used up, some prepaid cards allow cardholders to reload them, while others do not. Gift cards fall into the latter category, which is their main distinguishing characteristic. Gift cards are non-reloadable prepaid cards that can be used anywhere the card brand whose logo they display (Visa™, MasterCard™, etc.) is accepted. The stored dollar amounts can vary. The card is automatically activated at the time it is purchased. Many retailers don't want people to give the same gift card every year so many major retail chains are releasing unusual designs to encourage shoppers to open their wallets. Some consumer electronics companies offer more than 50 types of gift cards, including one made from recycled plastic and one that doubles as a set of speakers for an MP3 player. A survey by the National Retail Federation found that more than half of U.S. consumers plan to buy gift cards, with shoppers spending an average of more than $100 on them. The inventor believes that this will result in significant demand for uniquely-designed stored-value cards that have dual functionality and appeal above the traditional card itself.

With the advancement of cell phone technology and increasing demand for stored-value card concepts, the inventor believes that there is a need for a dual purpose, convenient, and inexpensive mounting apparatus that allows for hands-free pictures/video, and that also comprises traditional stored-value card functions. There is a need for such a mounting apparatus that uses an easy-to-use and long-lived mounting mechanism, such as the preferred suction cups, that is operable with most present day smartphones and other similar electronic devices. There is a need for a dual-purpose apparatus provides traditional stored-value card that functions at least for a period of time, but then extends the life of the card as a digital device accessory upon depletion of the stored value. This invention addresses these needs.

SUMMARY

The present invention comprises a mounting apparatus comprising a card as a generally-planar platform having a connection mechanism on both sides of the card, for connecting an electronic or other device to a surface or object. For example, the connection mechanism on one side may connect to an electronic digital device and the connection on the other side may connect to a generally vertical or other surface or object to which it is desirable to connect the digital device for hands-free camera or video recording. In certain embodiments, the connection mechanisms are suction cups that are secured to the card/platform, and in especially-preferred embodiments, the suction cups are multiple-cup suction cups units that extend through the card/platform so that one cup extends out from each side of the card/platform.

In certain embodiments, the multiple-cup suction cup units are attached to the card/platform by extending through holes, wherein the size and/or shape of each hole relative to the central portion/axle of its respective suction cup unit allows installation of the suction cup unit but also securely retains the suction cup unit during use. With at least one, and preferably multiple, suction cups thus-provided on each side of the card-platform, the preferred mounting apparatus is adapted to removably capture/hold a portable electronic device and suspend it from a smooth surface or object, for example, to retain the electronic device in a desirable position during use as a camera or video recorder. Certain embodiments are adapted to hold the electronic device in a horizontal/landscape orientation, although the card and/or the digital device may be rotated by 90 degrees to place the electronic device in a portrait orientation.

In certain embodiments, the card platform (also "card" hereafter) includes a single-layer of material, in which appropriately-sized holes are die-cut or otherwise provided to receive the suction cup units, with the resulting mounting apparatus featuring cups and card all being held together as a single unit. The card platform dimensions are designed to allow an electronic device to be affixed via the suction cups to the LCD touch screen and securely held with the camera lens is exposed during use, such as picture taking and/or video taking. The preferred double-sided suction cup units are of a small enough size to allow multiple suction cup units to be inserted/affixed to the card platform. It is a further object of certain embodiments to provide a double-sided suction cup apparatus for differently-sized devices such as small tablets, and modern smartphone models with touch screen capability. The preferred suction cups have a holding strength rated for at least 1 pound (each), therefore, with the use of multiple cups, the holding power of the multiple-cup apparatus is sufficient in strength to suspend a wide range of devices from a smooth, vertical (including generally vertical) surface or object.

Certain embodiments of the invention may be multi-purpose apparatus for example, by adapting the card platform to have an additional function(s), or to be attached or connected to a member having additional function(s). For example, the card platform may itself be and/or have functions of a stored-value card or to be attached/connected to a stored-value card, but different or additional adaptations may be envisioned from this disclosure by one of average skill in the art. For example, in addition or instead, the card platform may itself be (or may be attached/connected to) a business card, a preferred customer card, a membership card, an identification card, a branding card, a luggage tag, a key card, an advertising card/sheet, and/or cards/platforms having other utilitarian, informational or decoration functions.

One example would be a card platform that comprises (or the card platform being connection to a member that comprises) a scratch-off promotional code that would allow a user to log onto a retailer's website and purchase goods at a discount using the code. Certain of these alternative uses may require modified shapes compared to the preferred rectangular shape, but one may understand from this disclosure that the mounting apparatus or the member(s) to which it is connected/attached, could still function in similar fashion even with an altered card platform shape, such as a square, oval, trapezoid, or some other geometric or decorative design shape.

In certain embodiments, the mounting apparatus card platform is a piece of material cut out from sheet material(s) in a rectangular shape, such as a traditional credit card or stored-value card shape, with die-cut holes that allow insertion of the double-suction-cup units. The sheet material overall thickness is typically less than ⅛", but with sufficient rigidity and strength to securely retain the inserted suction cups within the slots. The sheet material may be, for example, PVC, plastic, rigid paper products, or laminated Teslin™. These cards are traditionally made in sheets and then information and logos can be printed on the sheets prior to the cards being cut out. Additionally, magnetic strips, QR codes (Quick Response Code), barcode features, scratch off codes, magnetic strip features, smart-chips, or others functional or indicia features are often printed/applied onto the sheet material prior to cutting. The cutting process utilizes a custom die-cut mold, which allows a card of specific dimensions, size, and shape to be cut, and also allowing holes to be cut at the interior of the card (inward compared to the outer perimeter edge), for example, for hanging on a retail peg/hanger display. These printing and cutting processes are known and well-established. The inventor believes, however, that it is new and unobvious to create pre-cut holes in any of various card designs that are sized and shaped and/or otherwise adapted to allow the suction cups to be inserted therein/therethrough, and that it is new and unobvious to create an assembly of such a card with at least one suction cup on each of the front and the rear of the card.

In certain embodiments, two or more suction cup retention holes or apertures (also "slots") are cut through the card platform (or "main body"). The diameter and/or shape of the retention holes is preferably wider than the central portion/axle of the suction cup unit, to allow the preferred suction cup unit to fit through the opening in the desired fashion and to allow the suction cup unit to be retained in the card during use as desired. These retention hole openings only occupy a portion of the surface area of the card itself, therefore additional open space exists on the card platform in/on which to integrate the aforementioned stored-value card or other features, including, but not limited to bar codes, scratch off codes, or magnetic strip features, and/or smart-chips. The card platform may also optionally contain printed images, indicia, information, logos, artwork, etc.

While the following description details preferred embodiments, it will be understood that such detail need not be strictly adhered to, but that additional changes and modifications may suggest themselves to one skilled in the art, all falling within the scope of the invention as defined by the claims.

BRIEF DESCRIPTION OF THE DRAWINGS

The following description of the apparatus can be understood in light of the Figures, in which:

FIG. 1 is a front isometric view of one embodiment of the invented mounting apparatus, fully assembled with suction cups in place within the slots, wherein the figure identifies a preferred, but not the only, location of certain various stored-value card features such as the mag-stripe, barcode, and scratch-off pin code.

FIG. 2 is a front isometric view of the embodiment of FIG. 1 with only one suction cup unit in place, and one side of another double-suction-cup unit being squeezed to a point to allow for easy insertion through a preferred raindrop-shaped insertion slot.

FIG. 3 is a front isometric view of the embodiment of FIG. 1 attached to the screen of a smartphone device.

FIG. 3A is a cross-sectional view of the assembly of FIG. 3, viewed along line 3A-3A in FIG. 3.

FIG. 16 is a front isometric view of the mounting apparatus of FIG. 1 removably attached to an additional stored-value card having a matching barcode, and wherein the additional stored-value card is removably attached to a hanger member for retail display. [0040]

FIG. 17 is a side view of the assembly of FIG. 16.

DETAILED DESCRIPTION

Referring to the figures, there are shown several, but not the only, embodiments of a mounting apparatus for securing an electronic device that preferably contains photo and video recording capabilities. The preferred embodiment comprises a stored-value card with suction cup capability, but other types of cards (and/or connection to other types of cards) having various functional capabilities, such as financial, identification, informational, or decorative features may be included in certain embodiments of the invention.

Figure 18:
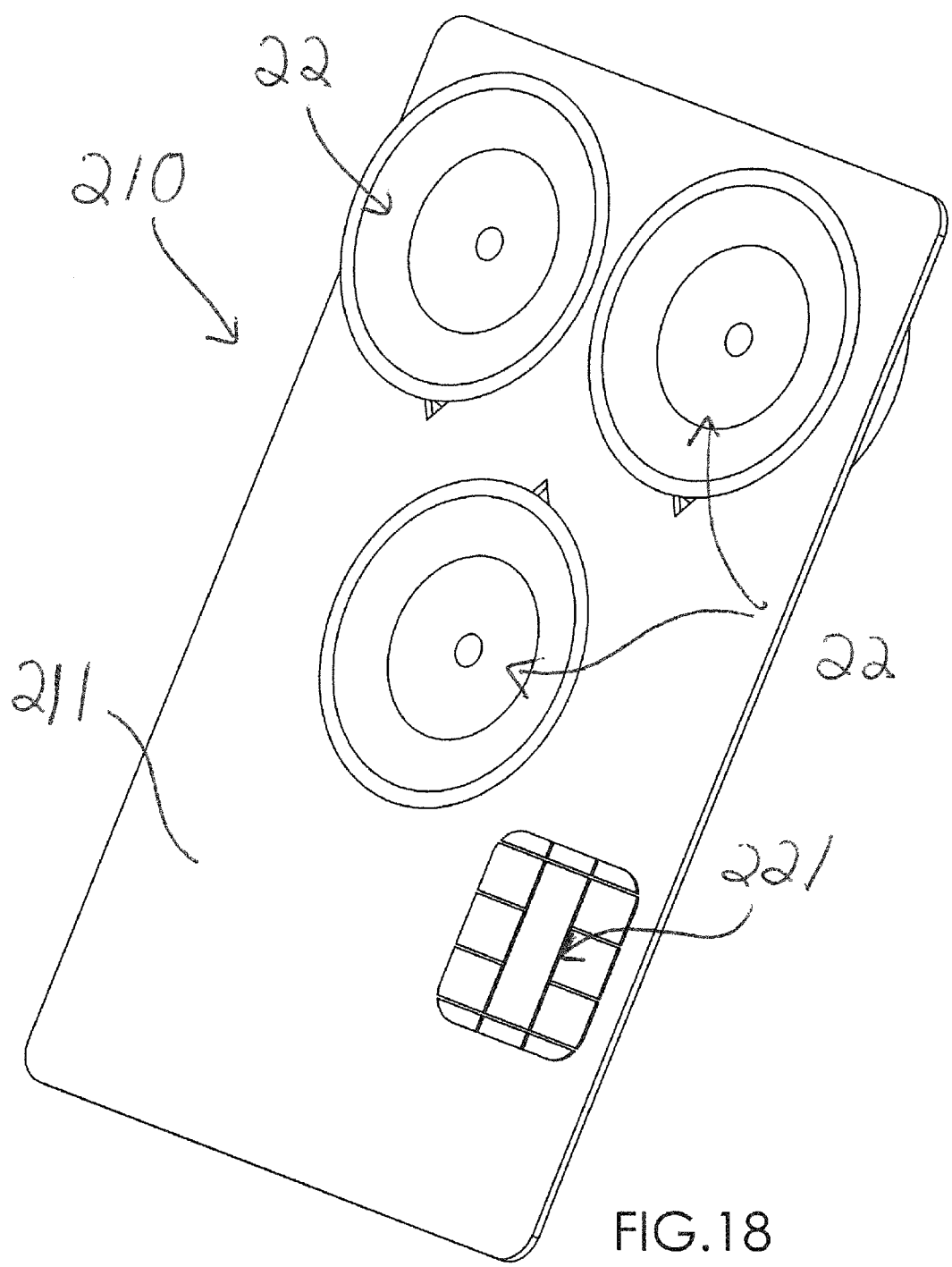
FIG. 18 is a front isometric view of an alternative mounting apparatus that includes an embodiment of a smart-chip on the front of the card.

Certain embodiments of mounting apparatus comprising suction cups and stored-value card are shown assembled and by themselves in FIGS. 1, 16, and 17. An embodiment of the mounting apparatus is shown partially assembled with one or more cups in place in FIG. 2, and in exploded view with an electronic digital device in FIG. 4. Certain embodiments of the mounting apparatus are shown assembled and attached to an electronic device in FIGS. 3 and 3A, and also connected to a surface/object in FIGS. 5-10. Alternative embodiments of the card are shown without suction cups in FIGS. 11-15. The mounting apparatus is shown removably attached to a linked stored-value card and retail hanger in FIGS. 16-17. An example of a smart-chip-containing embodiment is shown in FIG. 18.

In certain embodiments, the mounting apparatus comprises: a first portion that comprises a card platform that is a stored-value card, wherein the first portion has a front side and a rear side opposite the front side, and various holes pre-cut for insertion of double-sided suction cup units. An account identifier may be statically connected to the rear side (back or rear exterior surface), the account identifier being machine readable and linked to a financial account or record such that the stored-value card is configured to facilitate payment toward one or more of goods and services from the financial account or record via the account identifier.

Optionally, a magnetic stripe (mag-stripe) may be incorporated into the certain embodiments of the apparatus. A magnetic stripe card is a type of card capable of storing data by modifying the magnetism of tiny iron-based magnetic particles on a band of magnetic material on the card. The magnetic stripe, sometimes called a swipe card or a mag-stripe, is read by swiping the stripe past a magnetic reading head. In the preferred use in certain embodiments of the invention, the mag-stripe can optionally be oriented in two different directions.

The traditional orientation of a mag-stripe is to align the stripe in parallel with the longer horizontal length of the rectangular card, at a specific distance from the edge, to allow the mag-stripe to be properly read by conventional mag-stripe readers. Traditionally, the magnetic stripe is located 0.223 inches (5.66 mm) from the edge of a card, and is 0.375 inches (9.52 mm) wide. Mag-stripes following these specifications can typically be read by most point-of-sale hardware, which are simply general-purpose computers that can be programmed to perform specific tasks.

The alternative orientation is to align the mag-stripe in parallel with the short side of the rectangular card. In this shorter length, the mag-stripe must be encoded using "condensed encoding" as a result of this shorter length. With this "condensed" process, one limitation is that the stripe is limited due to the number of characters that can be placed on the card/stripe. For example, a typical mag-stripe allows for 84 characters. The mag is encrypted so it has start/end sentinels as well as other marks—a sixteen digit card number (which is pretty standard in the card industry) is actually 30 digits when it is encrypted. With condensed encoding the maximum characters that will fit is about half (42 characters) on the small stripe. A second limitation is associated with the card readers themselves; it is preferred to use an integrated POS solution to read a "mini-card" (having the "small stripe"), the POS solution typically being a reader integrated into a keyboard system like Micros, Aloha and NCR offer. Such readers are available, for example at major retailers like Best Buy, Target, and REI, but are not ubiquitous.

Stored-value cards come in many forms that may be incorporated into certain embodiments of the invention. A conventional stored-value card may be described as a restricted monetary equivalent or scrip that is issued by retailers or banks to be used as an alternative to a non-monetary gift; it will understood from this disclosure that stored-value card used in certain embodiments of the invention have been adapted over and beyond a conventional stored-value card in order to be part of the assembly of the mounting apparatus.

The gift card, like many other stored-value cards, can be "re-charged" or "reloaded" at the direction of the original consumer, the gift recipient, or third party. The term "loading on" or "loaded on" herein should be interpreted to include adding to the balance of a financial account or record associated with a stored-value card. The balance associated with a stored-value card declines as the card is used, encouraging repeat visits. The card remains in the user's purse or wallet, serving as an advertisement or reminder to re-visit the associated merchant. Gift cards, according to embodiments of the invention, provide a number of advantages to both the consumer and the merchant. Other gift cards and stored-value cards according to certain embodiments of the invention may include loyalty cards, merchandise return cards, electronic gift certificates, employee cards, frequency cards, pre-paid cards, and other types of cards associated with or representing purchasing power or monetary value, for example. The dual functionality of certain embodiments of the invention, for example a stored-value attribute plus the double-sided suction cup mounting attribute, allows for a longer life span of the apparatus compared to traditional stored-value card products due to the additional functionality as the apparatus being an accessory to be used with an electronic device. As such, it is possible that a person may elect to keep the card once the stored value is depleted, for use in taking self-photos or videos, thereby extending the life and utility of the device.

One side of the mounting apparatus is removably affixed/suction-cupped to the screen of an electronic device, allowing the other side of the mounting apparatus to be attached to a smooth surface/object in landscape orientation, that is, "held horizontally", or in a portrait orientation, "held vertically". By removably affixing/suction-cupping the mounting apparatus to the screen of the electronic device, the camera lens, which is on the side of the electronic device opposite the screen, remains exposed for use.

The electronic devices for which the apparatus is intended include a camera feature with photo and/or video functionality, and a timer function or alternative shutter option that can be set prior to suspending the apparatus. For example, nearly any smartphone has the capability to download applications ("Apps") with upgraded camera shutter functions which allow a user to take self-photos. These camera shutter functions can be initiated either utilizing a preset time, or can be initiated by sound, such as a clapping noise or voice command. More enhanced shutter features also include time lapse photo features for taking multiple pictures over a period of time. For example, after a timer is set, the mounting apparatus is attached to the screen of the electronic device (leaving the camera lens exposed), and the still-exposed suction cup(s) of the mounting apparatus are then pressed onto a smooth surface to allow the user to walk away to pose for the photograph, effectively taking a self-photo/video or allowing the user to join group photos/videos. This suspension of the electronic device may be extremely useful for traveler(s) who want classic tourist-photos or group photos without asking a stranger to take the photos. This also may be extremely useful for road travelers who want photos of themselves and their companions in a scenic environment wherein there are no such "strangers" to hold the camera, wherein the present invention can be suspended from the exterior windows of a vehicle, or smooth panels. This method can also serve the day to day functions of smartphone owners that take self-photos, providing a simple alternative to directing the camera lens into a minor in order to capture a self-photo.

An object of certain embodiments is to produce/manufacture the mounting apparatus from pre-existing parts/materials, but in a unique combination that has not previously been taught. The preferred card design would however require a custom die cut tool to obtain the preferred shape and orientation of the card and associated retention holes/slots. The inventor believes that the advantageous quality and unusual results obtained from such a combination of commercially available and/or easily-adaptable parts has not previously been recognized or achieved.

Hereafter, the specific design elements of this preferred embodiments will be described with reference to the accompanying drawings and reference numbers. In the following detailed description, reference numerals and letters are used to identify structural elements, portion of elements, surfaces, objects, or features that may further be explained by the entire written specification. Unless otherwise indicated, the drawings are intended to be read together with the specification and are considered to be a portion of the entire written description of the invention. The matters defined in the description, such as the detailed construction and elements, are details provided to assist those of ordinary skill in the art in a comprehensive understanding of the broad scope of the invention as defined by the claims herein.

FIG. 1 is a front, isometric view of one embodiment, a mounting apparatus 10 that is an assembly comprising a specially-adapted card and suction cup apparatus. The card 11 comprises holes or "slot openings" or "slots" 22, and suction cup units 12 are inserted into/through the slots 22. The suction cup units 12 are securely held in place within the slots 22 due to the central suction cup body 13 of each unit 12 fitting sufficiently tightly in its respective slot 22 that it will not fall out or be forced out during normal use while suspending an electronic device. A user may purposely remove a unit 12 from its respective slot 22, but this requires manipulation and pulling of the unit 12 out from the slot 22 in a manner that will not occur during normal use of the apparatus 10. The central suction cup body 13 may also be described as the "axle" or a "cup-connector" between the opposing front (12B) and rear (12A) cups of each unit 12.

The main body of the card is rigid or substantially rigid, and are typically cut from large PVC, other plastic/polymer, or other sheet materials, that are color-printed prior to cutting. Additionally, the magnetic strip 14 and barcode 18 and/or other smart-card features, such as are described below, are typically applied to the larger sheets prior to cutting. The sheet manufacturing nature of the process allows for customizable sizes of such cards and custom color-printing meeting the needs of various retailers, users, etc. The card surface may include indicia such as decorative indicia or brand indicia (not shown), including decorative indicia that relates to a particular occasion, such as a wedding, new baby, graduation, holiday, season, brand identifier, media format identifier, or other visual design to promote purchase of stored-value card. In certain embodiments, decorative indicia areas could include a picture or a graphic, wherein the decorative indicia may encompass a majority of the front or rear surface of the card, and include all or a portion of a character, art-piece, animal, or scene, relating to and readily identifiable as being associated with a company, movie, club, or other business or charity entity. Decorative indicia are one example of means for associating stored-value card with at least one of a product brand, a store, a holiday, a season, an occasion, and a media format identifier. Brand indicia areas on the card would identify a brand associated with stored-value card, such as identifying a product brand, a store brand, etc.

Certain embodiments of the card 11 may be described as having one or more features integrated onto the front or back surface, wherein one or more of the features are identifier(s), data-storage, or informational device(s) readily readable by a point-of-sale terminal or other account access station or kiosk. The card 11 that is portrayed in FIG. 1 includes multiple stored-value card features, but other features may be used, including fewer or more features. Card 11 is shown with mag-stripe 14, serial number 16, barcode 18, and key code or scratch off pin number 20. The mag-stripe 14, and barcode 18 and its linked serial numbers 16, all extend along the lower portion of the main body of the card 11 parallel to each other, that is, extending across the width of the card 11 transversely to the longitudinal axis. An optional key code/scratch off pin code 20 extends parallel to the longitudinal axis of the card 11.

These traditional card features may be located at various locations on the card 11 or omitted as desired. In any event, it is preferred that the suction cup slots be placed to not restrict the use of these features. Given the relative size of the suction cup units 22 to the card surfaces, sufficient space on the back and front of the card 11 is available to integrate the various stored-value card features to obtain the desired multi-functional device.

Account identifiers and/or data/record storage devices (such as 16, 18, 20) printed/applied on outside surface of the card 11 will typically indicate a financial account or record to which stored-value card is linked. The account or record of the monetary balance on the stored-value card optionally is maintained on a database, other electronic or manual record-keeping system, or, in the case of "smart" cards for example, on a chip or other electronics or devices on stored-value card itself. Accordingly, by scanning account identifier barcode 18, a financial account or record linked to card 11 is identified and can subsequently be activated, have amounts debited therefrom, and/or have amounts added thereto. With the above in mind, account identifier serial numbers 16 are one example of means for linking stored-value card with a financial account or record, and scanning of account identifier barcode 18 is one example of means for activating or loading value on stored-value card.

As understood from FIGS. 1 and 2, the card 11 contains one or more apertures, and preferably a plurality of apertures, which are each also called herein a "hole" or "slot" 22. Each slot 22 extends all the way through the card 11 from the front surface to the rear surface. Referring to the embodiment of FIGS. 1 and 2, three slots 22 are positioned in an upper portion of the card 11 to leave sufficient space for the stored-value card features below the slots 22. The orientation and location of each slot 22 is preferably adapted to capture the suction cups yet maintain sufficient separation/distancing of the cups so as to allow each cups to properly function when fully compressed rather than abutting or interfering with adjacent cups.

Figure 4:
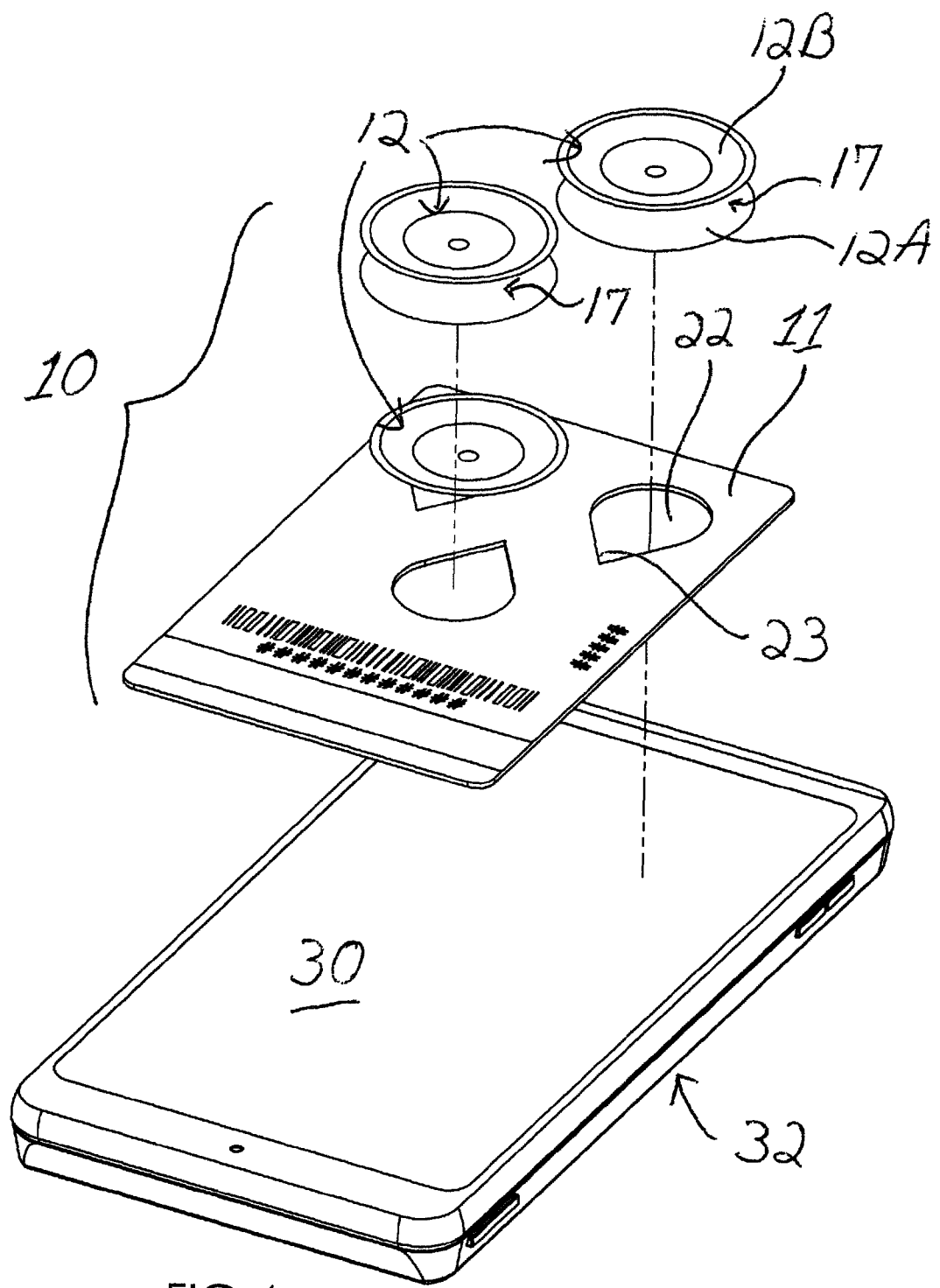
FIG. 4 is an exploded isometric view of the mounting apparatus and smartphone assembly of FIG. 3, with one of the suction cup units installed in the card of the mounting assembly and two of the suction cup units removed (in exploded view) from the card.

It may be noted, and shown to best advantage in FIGS. 3A and 4, that the preferred double-sided suction cup 12 comprises two opposing (oppositely outward facing) suctions cups connected together at a central region of the main body 13. The central region of the main body 13 of each of the suction cup units 12 preferably has a diameter slightly smaller than the main portion of the slot opening 22, which thereby allows the cup unit 12 to be securely held in place and not to be easily removed, with limited side-to-side movement of the cup unit 12 relative to the card 11.

The slots 22 are each shaped like a raindrop, having a rounded portion 24 and a pointed portion 23 as is best illustrated by the empty slot 22 at the top left of the card 11 in FIG. 2. Point 23 results from the radius of that portion of the slot being enlarged relative to the radius of the rounded portion 24. The enlarged portion ending in point 23 provides extra room for insertion of the unit 12, especially when the unit is squeezed/folded to be inserted into the slot 22, as further discussed below.

The size of the slot 22 is preferably adapted to allow convenient installation of the double-suction-cup units 12 into the card, and also secure retention of the units 12 after installation during use. Therefore, the radius of the main portion (rounded portion 24) of the slot is sized to be close to the radius of the central suction cup body 13, while the enlarged portion ("point 23" or the pointed portion) is sized to have a radius close to the outer perimeter of the cup, so that the diameter of the slot passing through the point 23 is close to the diameter of the cup. For example, the radius of the main portion (rounded portion) of the preferred slot may be 5-30 percent larger (and more preferably 10-20 percent larger) than the radius of the central suction cup body 13, and the radius of the enlarged portion (at the point 23) may be 5-30 percent larger (and more preferably 10-20 percent larger) than the radius of the outer perimeter of the suction cup. This way, as described above, one suction cup of the suction cup unit 12 may be folded/pinched-together to flatten a portion, or all, of the cup and it may be pushed into the slot with the length of the folded/pinched cup parallel to the longest diameter of the slot. This way, the suction cup will slide through the slot's largest diameter more easily. Once properly inserted, the suction cup can be released by the user, and the cup returns to its normal shape, the close fit of the rounded (circular, non-enlarged) portion 24 with the central suction cup body 13 prevents the cup from sliding out or being pulled from the slot by the forces of normal use, because the cup perimeter is blocked from sliding out of the hole by the card surface around the slot, and the forces of normal use will not tend to squeeze or pinch the cup to an extent wherein it would slide out of the slot.

Therefore, it may be understood that the front cup of the lower suction cup unit in FIG. 2 is portrayed as having just been squeezed/pinched/folded and pushed from the rear of the card (behind the card in FIG. 2) through the slot to its position in FIG. 2, but wherein the squeezed/pinched cup is portrayed as not yet resiliently returning to its normal round shape. When inserting the double-sided cup unit 12 into each slot, the preferred method is to partially insert the cup, that is, to insert one side (end or edge 17) of the cup through the rounded region 24 of the slot 22, that is the region away from the slot point 23, and then to squeeze the other, opposing side 15 of the cup to a point P (see arrows in FIG. 2), which allows the squeezed/pinched portion 15 and its point P to be pushed through the pointed portion (23) of the slot 22 into generally the position shown for the lower front cup in FIG. 2. Immediately or very soon after pushing the pinched cup through the slot, it would relax to its normal, circular shape such as shown by the cup at the upper right side of the card in FIG. 2.

FIG. 3 illustrates a front isometric view of the device 10, with the inserted suction cup units 12 in place in the card 11. In FIG. 3, the rear cup 12A of each unit 12 is suction-connected to the screen 30 of the electronic device 32, and the front cup 12B of each unit 12 is available for suction-connection to a smooth surface or object. The rear-cup-to-screen 30 connection is preferably done prior to connection of the front cups 12B to said surface/object, to ensure the rear cups 12A are securely attached to the electronic device prior to suspension from a vertical surface/object.

FIG. 3A illustrates an end cross-sectional view of FIG. 3, illustrating the rear cups 12A attachment to the screen 30 of an electronic device 32. Visible in FIG. 3A, but described in more detail later in this document, a gap 17 is located between the sides of the opposing cups of the unit 22, created, in effect, by the smaller-diameter central suction cup body 13 connecting the larger-diameter rear and front cups 12A, 12B. With the unit 12 inserted through its respective slot 22, the card 11 extends around said central suction cup body 13 in said gap 17. The central suction cup body 13 is best shown here, with a diameter that is only slightly smaller than the main portion (rounded portion 24) diameter of the slot opening to ensure a close fit and limited movement while the cup body 13 is in the slot. The space 26 between the suction cup 12A and the screen 30 of the device 32 is best seen here for the one cross-sectioned cup, the inherent resilience of the cup creating a suction/vacuum connection between the surface 27 of the cups 12 and the screen 30, thereby allowing for a tightly-held connection.

FIG. 4 illustrates an exploded view of the apparatus 10 illustrating the preferred connection and orientation of the suction cups relative to the card 11 and electronic device 32. The raindrop-shaped suction cup slots 22 of the card 11 are best shown here with the suction cup units 12 depicted with the preferred orientation passing through suction cup slots 22, and oriented downward in this figure to be attached to the smooth glass screen 30 surface of the device 32. The gaps 17 at the sides of the cups 12 creates the spaces, discussed above, in which the card encircles, and thus captures, each unit 12. Said capturing is sufficiently tight/close to limit unwanted shaking or other movement of the suction cups 12 relative to the card 11 for maintaining the preferred orientation of the apparatus 10 and the device 32, and the tight fit against the smooth surfaces for proper suction.

Figure 5:
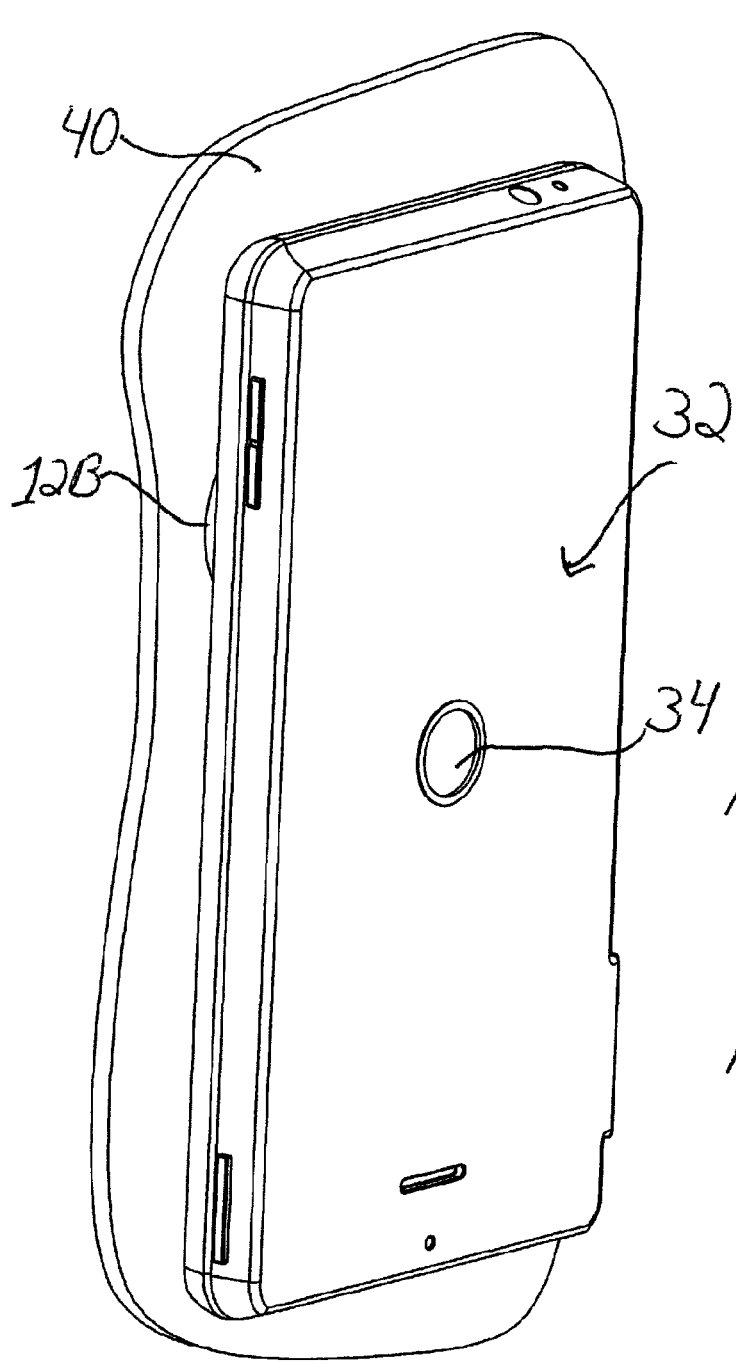
FIG. 5 is a front isometric view of the mounting apparatus and smartphone assembly of FIG. 3 connected to a vertical surface such as a glass window, with the smartphone in portrait orientation.

FIG. 5 illustrates a front isometric view depicting an electronic device 32 suspended from a smooth vertical surface 50 in portrait orientation with camera lens 34 exposed for use. The apparatus 10 is not clearly shown in FIG. 5 and only a small portion of a suction cup unit 12 is shown along the edge of the electronic device, as the apparatus 10 is generally hidden between the device 32 and the surface 40.

Figure 6:
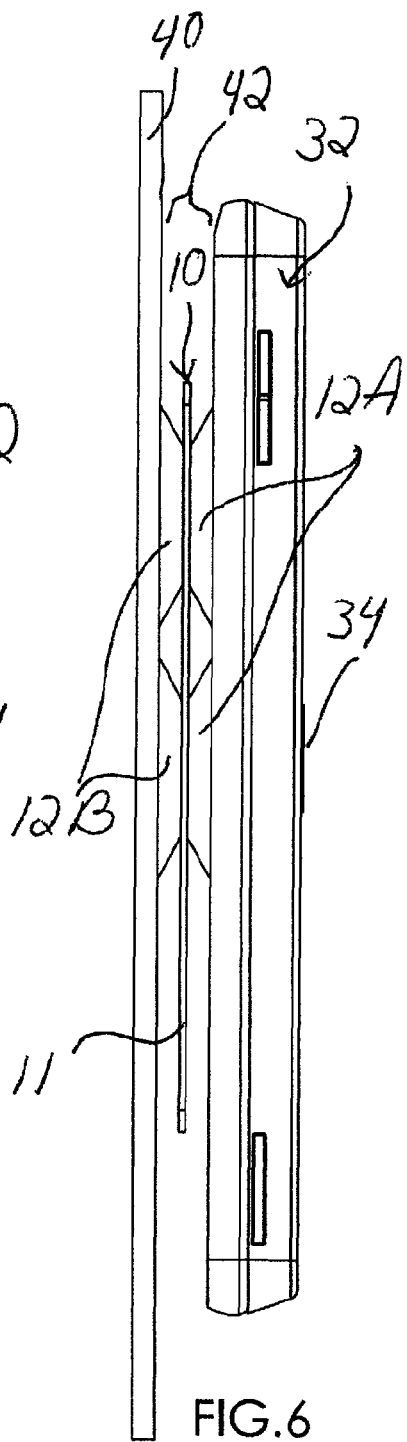
FIG. 6 is a side view of the assembly of FIG. 5, that is, the combined smartphone, mounting apparatus, and vertical surface of FIG. 5.

FIG. 6 depicts a side view of the structure as arranged in FIG. 5, wherein the device 32 is suspended from the surface 40 by secure suction-connection of the apparatus to both the device 32 and the surface 40. Due to the thickness of the apparatus 10, a gap 42 is created between the electronic device 32 and the smooth vertical surface 40. This gap is shown to best advantage here, which allows a person to insert a finger(s) into the gap 42, thereby allowing him/her to pull the electronic device outwards to detach from the surface 40. The apparatus 10 is suction-connected to the screen for a portrait orientation wherein the card 11 is centrally aligned within the outer perimeter of the electronic device 32, with the card 11 and the screen 30 being parallel and the screen 30 and device 32 extending slightly outward beyond the perimeter of the card 11. In other words, the vertical centerline of the platform card 11 is preferably aligned with and parallel to the vertical centerline of device 32

Figure 7:
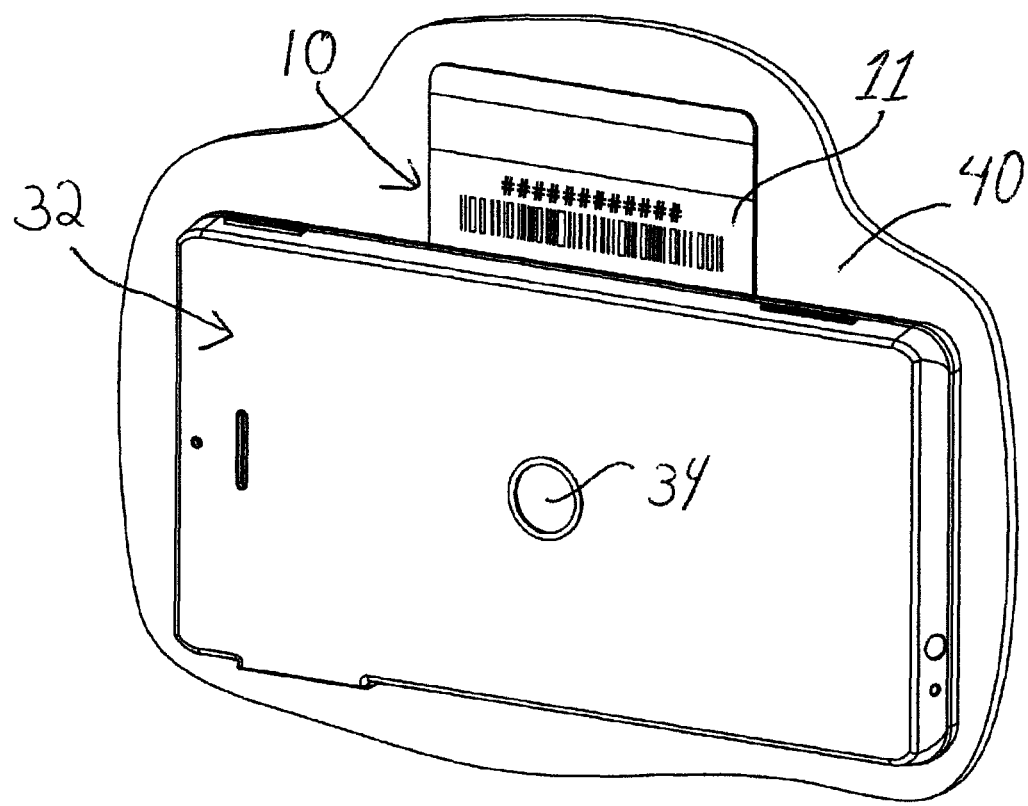
FIG. 7 is a front isometric view of the mounting apparatus embodiment of FIG. 1, in another orientation (180 degrees from the orientation in FIGS. 5 and 6, and flipped front to rear) and shown connecting a smartphone in landscape orientation to the vertical surface.
Figure 8:
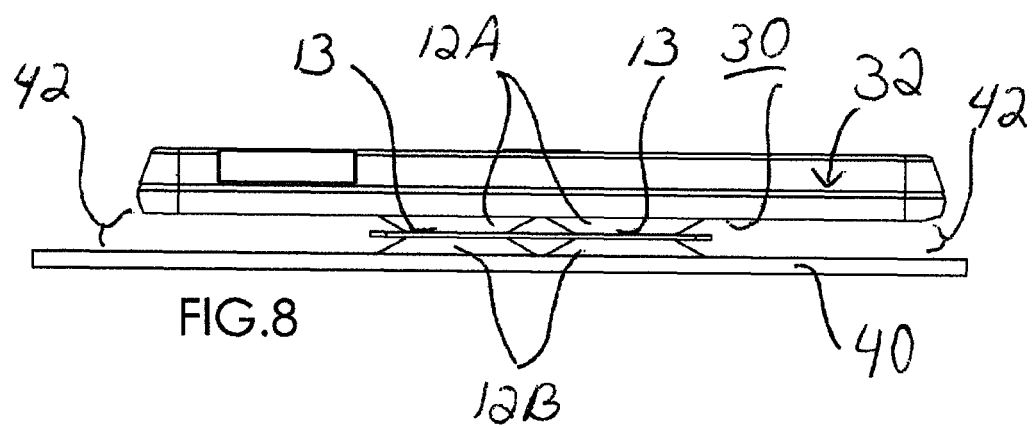
FIG. 8 is a bottom view of the assembly of FIG. 7.

An alternative orientation is depicted in FIG. 7, illustrating a landscape orientation of the electronic device 32 connected to a smooth vertical surface 40 by apparatus 10, wherein the longitudinal axis of card 11 is oriented perpendicular to the longitudinal axis of the device 32. FIG. 8 depicts a bottom view of the structure of FIG. 7, illustrating the preferred location of the suction cup units 12 near the center of the screen 30.

Figure 9:
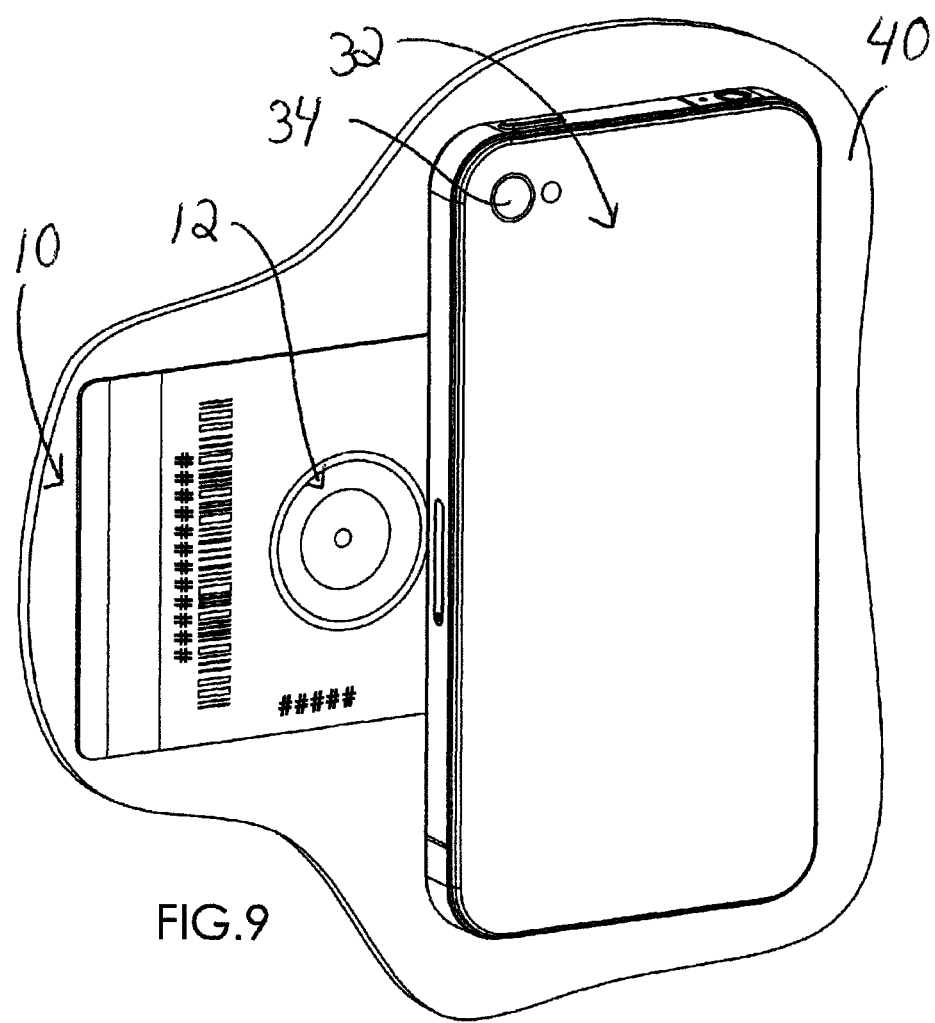
FIG. 9 is a front isometric view of the mounting apparatus of FIG. 1 in an alternative orientation (80 degrees from the orientation in FIG. 7) and shown connecting a smartphone in portrait orientation to a vertical surface by attachment of two of three suction front suction cups to the smartphone and by attachment of three suction cups to the vertical surface.
Figure 10:
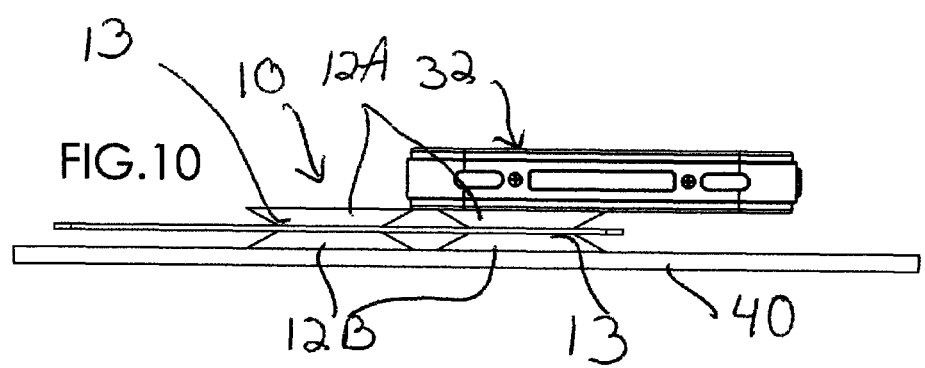
FIG. 10 is a bottom view of the assembly of FIG. 9.
Figure 11:
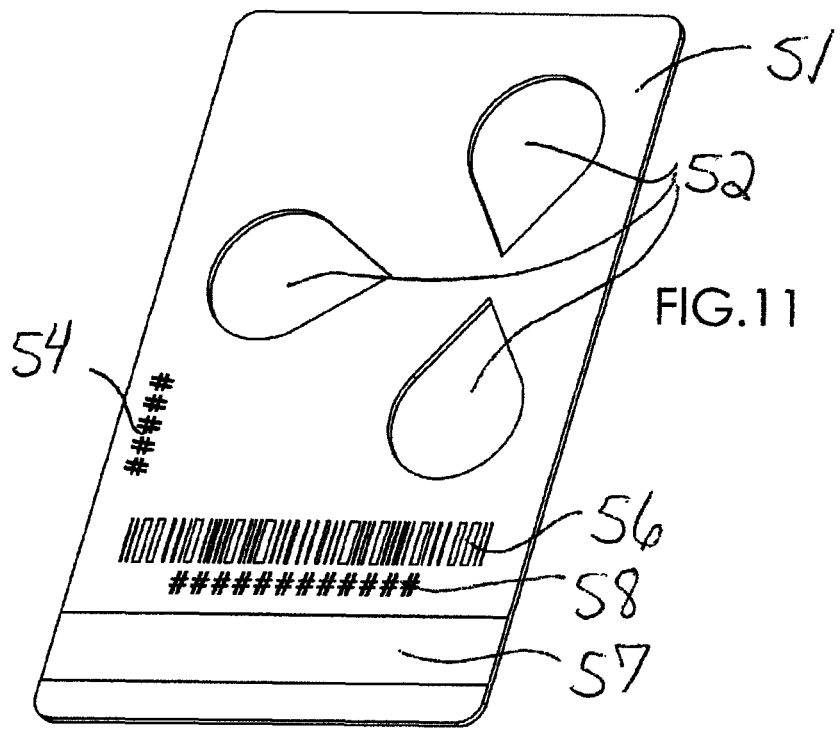
FIG. 11 is a front isometric view of an alternative embodiment of a card for a mounting apparatus, with an arrangement of suction cup slots different from that shown in FIG. 1, but still allowing for placement of various stored-value card features.

An alternative orientation is depicted in FIG. 9, illustrating a portrait orientation of the electronic device 32 with camera lens 34 exposed for use while attached to a smooth vertical surface 40. In this orientation, the card 11 is oriented perpendicular to the electronic device 32. Only two suction cups, rather than three, are being used for connection to the device 32, leaving one rear cup 12B exposed as shown. FIG. 10 depicts a bottom view of the embodiments of FIG. 9, illustrating the preferred location of the at least one (and here two) suction cups at or near the center of the screen 30.

Alternative card layouts and orientations are depicted in FIGS. 11-15, illustrating optional locations and configurations of the various features of certain cards. In the orientation shown in FIG. 11, the card 51 has a modified suction cup slot orientation that is slightly different from the card 11. This simply demonstrates the flexibility in slot location to achieve the same or similar results, only altering the location of the slots themselves, thereby also creating different locations for the open space at which to include additional indicia or artwork onto the surface of the card 51. This less preferred orientation could still incorporate all, or a selected number/type, of the features such as a pin code 54, barcode 56, mag strip 57, and/or serial number 58.

Figure 12:
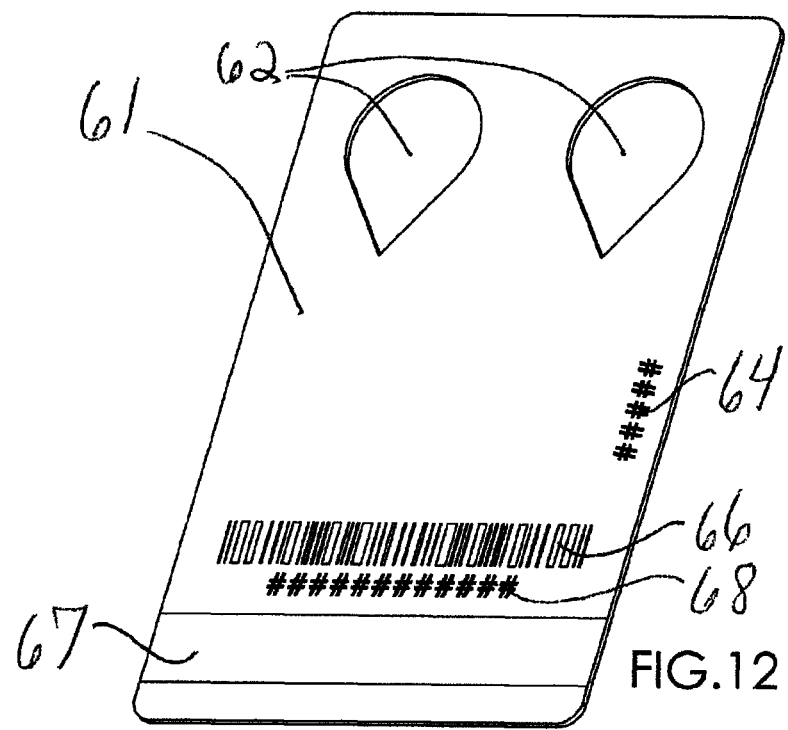
FIG. 12 is a front isometric view of an alternative embodiment of a card for a mounting apparatus, with only two suction cup slots.

FIG. 12 depicts another less-preferred embodiment, employing two suction cup slots 62 cut in the card 61. This less-preferred orientation would still allow for the intended functionality of the device by using only two cups, although does so by providing a lesser amount of holding force due to the reduced number of cups.

Figure 13:
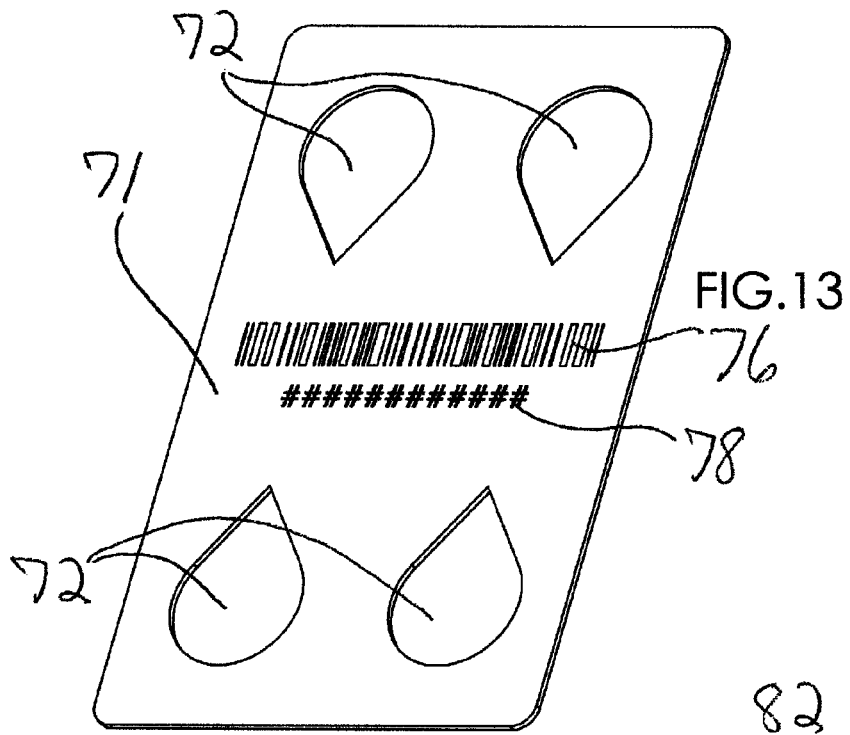
FIG. 13 is a front isometric view of an alternative embodiment of a card for a mounting apparatus, with four suction cup slots grouped into two set of two slots, one set being at each end of the card, and with stored-value card features between the sets of slots.

FIG. 13 depicts another less-preferred embodiment, employing four suction cup slots 72 cut within the card 71. This orientation and layout would restrict the integration of a mag strip into the card due to the locations of the cups slots 72 along all sides/edges of the card 71, but would still allow for a barcode 86 and serial number 88, and indicia.

Figure 14:
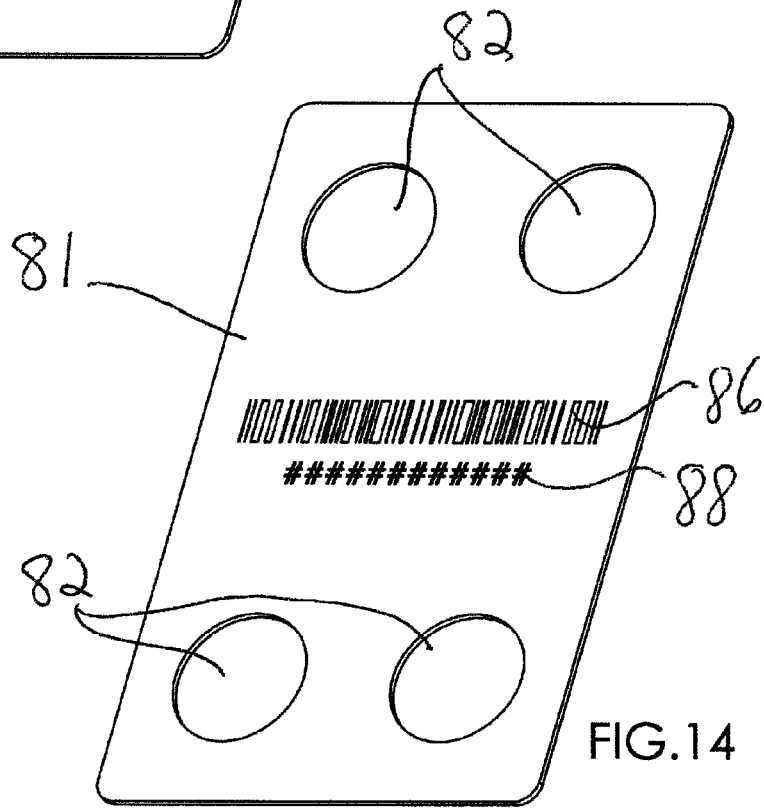
FIG. 14 is a front isometric view of an alternative embodiment of a card for a mounting apparatus, this card being similar to the card of FIG. 13 except that the suction cup retention slots are circular rather than cut in the preferred raindrop shape.

FIG. 14 depicts another less-preferred embodiment, employing alternative suction cup slots 82 that are entirely circular in shape rather than raindrop in shape. The circular slots are sized to have a diameter closely matching the diameter of the central suction cup body 13, and do not have any portion that is significantly enlarged relative to the central body 13. This slot shape will provide all the desired functionality of the multi-purpose apparatus, however the suction cup insertion process is considerably more challenging due to the less-preferred entirely-circular shape of the slots.

Figure 15:
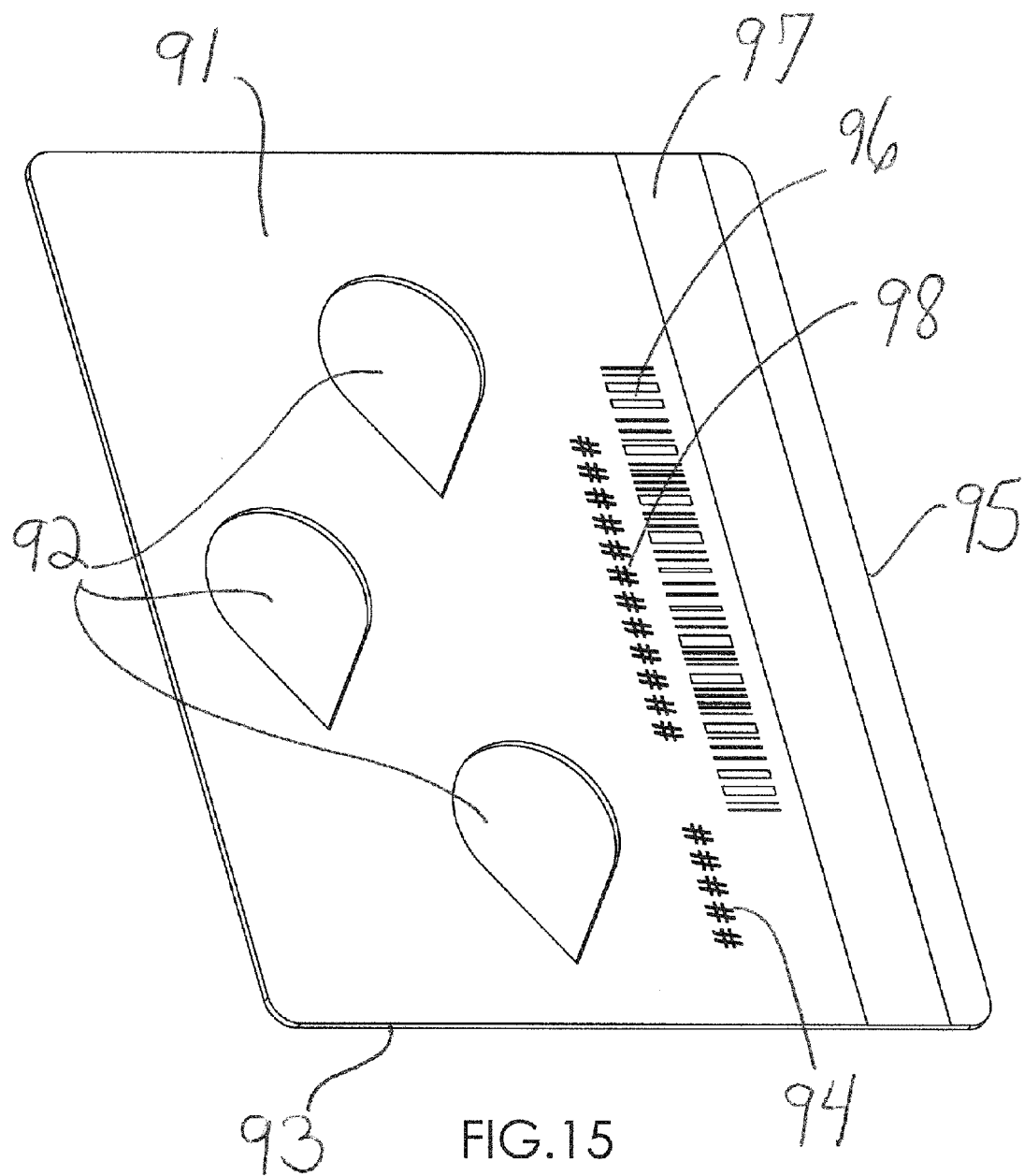
FIG. 15 is a front isometric view of an alternative embodiment of a card for a mounting apparatus, wherein the location of the suction cup retention slots are modified by placing them closer to one longitudinal edge than the other, leaving room for a mag-stripe to be located along the long edge of the card. This orientation of features may require the card to be wider than a standard stored-value card or credit card.

FIG. 15 depicts an alternative embodiment, employing a different location for the suction cup slots 92 on the card platform 91. This orientation requires the mag strip 97 to be located along the long side of the card 95, and the overall width of the card 93 (from left to right in the drawing) to be wider compared to the "standard stored-value" or "standard credit card" size. This expanded-width card width along the shorter side 93 will thereby allow three suction cup slots 92 and still allow the inclusion of a mag strip 97 along the long side 95 of the card 91. Due to the expanded size of the card 91, there remains sufficient space to integrate the use of a barcode 96, serial number 98, and pin number 94, as well as other indicia/information (not shown) on the front or rear of the card. This alternative design layout is only slightly modified from the "standard" card size, yet allows for the integration of a longer mag-stripe 97, which can be encoded with a higher number of bits of data.

FIGS. 16 and 17 depict one embodiment that is a combined unit 100 comprising a mounting apparatus 10' connected preferably temporarily with another stored-value card 101 or other card. The mounting apparatus 100 is preferably linked to the stored-value card 101 by means of shared account/balance/record information and/or other shared data/information. This layout incorporates the use of the an apparatus 10' that is the same or similar to earlier-described apparatus 10 except that it is temporarily connected to, and sold/offered with, card 101. The preferred features described for apparatus 10 are integrated onto the apparatus 10', including the mag-stripe 14, barcode 18, serial number 16, and pin number 20. Card 101 may be a more traditional stored-value card or other card, without means for mounting an electronic device to a surface/object. A perforated cut line 105 may extend between apparatus 10' and card 101, that is, extending along, and defining, the adjacent sides of the cards. The attached card 101 could optionally include the same account information as used on the preferred device 10, that is, the mag strip 114, barcode 118, serial number 116 and pin code 120 would be same as on both card 11 and card 101, to link the functionality and use of the card for account/balance/stored-value or other functions.

Additionally, the unit formed by connected cards 11, 101 could be removably attached to a retail display hang tag card 102, connected along a perforated edge 107 between card 101 and tag 102. This hang tag 102 would preferably include a slot opening 106 to allow the entire unit 100 to be hung in a traditional retail display. This design would allow the three components 102, 101, and 11 to be disconnected from one another after purchase. The hang tag 102 would likely be discarded, while the attached cards 101 and 11 would be kept to carry out further stored-value-card-oriented functions. With the two cards 101 and 11 linked to the same account by use of the identical account information within the stored-value card features, a person could then use them at different locations, or different points in time if they so desired. For example, the traditional stored-value card 101 could be carried in a wallet, allowing the stored value to be used when convenient. The attached multi-purpose card portion 11, could be carried in a purse or pocket, and used in instances when the other stored-value card 101 is not present. In other words, the stored-value card 11 could preferably include one or more account identifier(s) (bar code, key code, smart-chip, or mag strip) signifying a financial account or record linked to the removably attached stored-value card 101.

A dual-card structure could be used to combine services that are often sold individually on stored-value cards. Combining related services into a dual-card product thereby provides some convenience and marketing advantages. An example of this dual-card (or other numbers of cards) option would be a stored-value card that can be redeemed at a restaurant, while the other stored-value card could be redeemed at a movie theater, thus providing two distinct cards for dinner and a movie. Other logically-combined services could be dinner and dessert, or drinks and dinner, served at two different establishments, etc.

FIG. 18 depicts the front of an alternative mounting apparatus 210 identifying the optional inclusion and location of a smart-chip 221 located on the front of the card 211. Such a smart-chip 221 may be included as another or alternative saved-value card feature. A smart-chip, or integrated circuit card (ICC), is any pocket-sized card with embedded integrated circuits. Smart-chips integrated onto cards can serve as credit or ATM cards, gift cards, fuel cards, mobile phone SIMs, authorization cards for pay television, household utility pre-payment cards, high-security identification and access-control cards, and public transport and public phone payment cards. Such smart-chips on cards may also be used as electronic wallets. The smart-chip can be "loaded" with funds to pay parking meters, vending machines or merchants. Cryptographic protocols protect the exchange of money between the smart card and the machine. No connection to a bank is needed. This smart-chip feature is another feature that may optionally be integrated onto the multipurpose stored-value card, but would most likely be located at the front of the card with the other above-noted feature options.

General Descriptions of Preferred Features of Certain Embodiments

The modern day cellular or smartphone is the most convenient device that would be expected to be used for photo and/or video recording purposes. By their nature, camera devices (especially portable electronic devices with camera functions) are meant to be utilized by an individual taking pictures of scenery, or pictures of other persons. Often, however, the user would like to attach the portable camera device to a specific location (usually to an object such as a tripod), while using an automatic timer, and have it remain there until the picture taking process is completed. The problem arises when an individual desires to take a picture of himself/herself in a particular setting. This situation often occurs with portable devices, such as wireless or cellular telephones with a camera, where a user attaches the device to a tripod, or sets the phone on a flat/stable surface or other surface during the picture taking process is complete. Typically, tripods are constructed for and function to merely provide a stable object to affix a camera device, to allow for placement on a flat surface such as a floor or table top, or level topography such as the ground, roadway, or rock surface. The inventor believes that the major problems with traditional apparatus arise in transporting and/or storing a tripod on one's person, in a vehicle, in a suitcase, or in a backpack etc. A secondary problem is associated with a tripod's limited capability for use on vertical surfaces both outdoors and indoors. While a tripod can effectively be used in some circumstances, the convenience of such an apparatus is not conducive to everyday use.

Some specialty cellular/smartphone accessory devices for mounting of the phone have been developed but do not often fit into a pocket or purse, and are not often carried on a day to day basis by a typical person. Primary problems with prior art accessories includes large size, expensive manufacturing process, bulkiness, potential for breakage due to plastic-based components, inconvenience in transportation, limited use to one type of electronic device, etc. Often, finding an ideal surface to place a smart/cellular phone at the proper height is challenging, especially in outdoor settings. Traditional methods to not typically allow for dual camera orientation picture capture (portrait and landscape), as they most often only allow for a single orientation of the device.

The preferred multi-purpose cellular/smartphone mounting apparatus with stored-value card adaptations effectively reduces the size of the camera-phone-holding apparatus, allows for stored-value card functions, and easily provides a unique dual orientation capability (portrait and landscape), as well as allowing for more flexibility and convenience of picture-taking locations. The preferred embodiments effectively allow a user to place/affix his/her electronic device onto one side of the double-suction-cups, and affix the other side of the suction cups to any suction-cup-compatible surface (typically smooth surfaces, such as windows, smooth walls, automobiles, etc.) to allow for easier self-picture taking, or videos. The user sets a timer (or alternative shutter feature), suspends the phone and takes a self-photo, rather than holding onto the device or pointing the device into a mirror to capture the photo. The preferred multi-purpose mounting apparatus solves these issues in that is it small, lightweight, and has limited potential for breakage.

It may be noted that traditional stored-value cards are carried on one's person (in a pocket, purse, wallet, etc), and therefore are already being carried by a high percentage of the population, creating additional convenience and/or familiarly with the size, shape, and stored-value feature. Further, suction cups are understood and easily-used by most people, and are very inexpensive to manufacture. The components for the preferred embodiments may be made by two manufacturers, a card manufacturer and a suction cup manufacturer, and then assembled by someone else as described herein. The resulting mounting device may be easily carried on one's person, in a pocket, wallet, purse, back pack or other means, due to the small lightweight nature of the design and associated materials. The preferred mounting device will work with a high percentage of smartphone designs, thereby allowing the user to operate the device with their current smartphone model, or a different model that they may obtain in the future.

Certain embodiments of the mounting apparatus comprise a card that is entirely (or on its exterior or in it interior) firm, substantially rigid, or rigid, so that so that the various features on the main body do not break. Especially-preferred is stored-value card or credit card material that is firm and substantially rigid but that remain slightly bendable. The firmness and substantial rigidity of the card keeps the electronic device pointing in the desired and predictable direction for proper pointing at the subject of the photo/video, rather than twisting out of the desired field of view, or plane. The main body of which is preferably planar and continuous or substantially continuous and has two distinct halves or outer sides, for example, two sides with open space adjacent to each outer side for provision of mounting systems at the front and back of the rigid card.

The preferred rigid card comprises multiple suction cup retention holes, but it will be understood from this disclosure that one hole may be provided through the card platform, and "one or more hole" may be provided. Said one or more suction cup retention holes are created in the main body and/or otherwise provided as a portion(s) of the card itself. The general shape of the holes are preferably generally circular with one point (hence, a raindrop shape), however, other elongated hole shapes may be provided in certain embodiments, for example, oval, oblong, egg-shaped and possibly even elongated rectangle. Less-preferably, non-elongated hole shapes may be used, such as square or circular.

A particularly-preferred suction cup system utilizes what may be called "double-suction-cup units", or "mini double-suction-cups." Each unit is pulled partially through its respective hole/slot, so that the cup unit is retained in place in the hole/slot, with one cup facing out from one side of the card and the opposing cup facing out from the opposing side of the card, resulting in a forward-facing suction cup and a rearward-facing cup. By connecting a central region of the double-suction-cup unit (a region between and connecting the oppositely-facing cups) to the rigid card and allowing the oppositely-facing cups to protrude out away from the card in their forward and rearward directions, suction cup capability is provided in a convenient, compact, and interesting and/or stylish way. "Connecting" the central region of the double-suction-cup unit in the preferred embodiments means that the unit is inserted through the card so that rigid card structure extends in between the two opposing cups to surround or substantially surround the central region of the unit, which is smaller, or has a smaller diameter, than the two opposing cups, thereby blocking either cup (and hence the entire unit) from sliding through and out of the hole. No other means of connecting the central region or the unit is required in most embodiments, for example, adhesive, hooks, hook-and-loop fastener, and/or ties are not required. Thus, in certain embodiments, the mounting apparatus may be described as consisting essentially of, or consisting of, a card with at least one aperture (hole, slot) and at least one double-suction-cup unit installed in the aperture(s); the card may comprise other features, as described herein, for example, stored-value features. Especially-preferred embodiments will have 3-4 apertures and a corresponding number of double-suction-cup units.

It will be understood from the drawings and this description that a major portion of each hole/slot is preferably only slightly wider than the central region of the main body of the suction cup, but a raindrop (or teardrop) shaped hole/slot provided a pointed region that makes installation, and removal if desired, convenient and quick. A perfectly-circular hole/slot shape that is properly-sized to retain the cup unit during use will create challenges in installing (and removal when desired) the preferred suction cups. On the other hand, an elongated hole/slot shape, and particularly the preferred raindrop shape, may be properly sized to retain the cup unit during use but will allow convenient installation and removal when desired. The inventor believes that the shape that best allows the cups to be inserted, and yet retained in place for use, is the raindrop shape. Such a shape allows one side of the cup to be inserted at the widest part of the slot, while the other side of the cup can then be pressed/pinched/folded to fit and be pushed through the narrow, pointed end of the slot. This is because, when one portion of the edge of the suction cup is pushed/pinched together, the suction sup side/edge forms a small point at that portion of the edge, creating a shape reminiscent of a raindrop and thus being a similar shape as the slot, so that the pinched/pointed cup is more easily-inserted through the slot than would be other cup shapes.

When the suction cups are attached correctly, both sides of the cups are directed outwards from the card platform, but not coming into contact with the other cups either when relaxed at rest or compressed to form suction inside the interior space of the cup. While three suction cups is the preferred number of cups on each side of a card, it may be understood that the preferred number can be altered in certain embodiments to include less cups (2), or more cups (4-5), for example. Double-sided mini suction cups are the preferred quick-connect/disconnect fasteners, and are commercially-available. While is it preferred that the mounting systems are suction cups connected or fixed to the card, it will be understood that other mounting systems such as hooks could possibly be used in certain embodiments, for example, suction cups on one side for connection to a smartphone screen and hooks on the other side of the mounting apparatus for suspension from an object.

The main body of the rigid card may be described as having multiple features integrated onto the front or back surface. The card platform surfaces serve as a location for the various stored-value card features to be integrated; a mag-stripe that extends along the lower portion of the main body along the distance of the shorter side; a barcode with linked serial numbers; and an optional key code, or scratch off code; and optional smart-chip located on the front of the card. These are all traditional card features that can be located at various locations on the card, and can optionally be integrated onto the card, or intentionally omitted for specific card designs. The suction cup slots are preferably located so that they do not restrict the use of these features, and there remains to be sufficient space on the back and front of the card to integrate the various stored-value card features to obtain the desired multi-functional device.

The preferred materials described herein are available through conventional commerce. The mini double sided suction cups can be purchased at stores, or online directly from manufacturers. In addition, there are a variety of manufacturers and dealers of such materials online, which allows for bulk purchasing of such materials.

As used herein, the term "tightly", when used regarding a suction cup connection to a surface, refers to a fit including direct physical contact and air-sealing between at least a majority of cup surface and the surface/object surface, the contact and air-sealing being sufficient to create sufficient and sustained (for a desired amount of time, such as 2-5 minutes or more) suction/vacuum inside the interior of the suction cup. For proper use of the suction cups, the "sufficient" amount of suction is that maintaining placement of the cups supporting the weight of an electronic device to reliably counteract gravity, but is preferably relatively easy to overcome by purposeful user manipulation (as with attaching and removing the electronic device).

It may be noted that the average life of a traditional gift card is very short, likely only a few weeks or months, while certain embodiments of the invented product, having dual purposes, will allow for increased life span of the product, therefore enhancing the environmentally-friendly appeal of the product. Old gift cards may be gathered and recycled, by punching holes in them, and then inserting mini, double sided suction cups therein. This would be an alternative to creating new cards, and offer an environmentally-friendly alternative to throwing away traditional cards that no longer retain any value. The preferred designs are intended to result in a cheap manufacturing cost, further creating appeal to retailers looking for cost-effective gift card designs that stimulate higher sales and also enhance use of smartphone devices. The unique and simplified design features of the preferred embodiments allow a very low cost, which is a significant advantage over the prior art.

As used herein, directional-based descriptive terms, such as "front," "back," "side," "top," "bottom," and the like are used for ease of discussion. Such use is not to be interpreted as requiring use only in such direction or orientation, but only that these directional descriptors help the writer to describe elements of the embodiments relative to each other, and to describe the elements relative to example (but not necessarily all) electronic devices, and the card and cups themselves.

As used herein, the terms portrait and landscape refer to the page orientation of the camera/device as being vertical or horizontal. Page orientation is the way in which a rectangular page, or photograph, is oriented for normal viewing, in this case referenced as a vertical orientation of a rectangular shaped device. The two most common types of orientation are portrait and landscape. The specific word definition comes from the fact that a close-up portrait of a person's face and upper body is more fitting for a canvas or photo where the height of the display area is greater than the width. Landscape originally described artistic outdoor scenes where a wide view area is needed, but the upper part of the photo would be mostly sky and so is omitted. In this case, landscape is referred to as a horizontal orientation of a rectangular shaped electronic device (long dimension of the device being horizontal).

Certain embodiments may be described as a multiple-function device, for example, a dual-function device that is a stored-value card for use as a traditional stored-value card platform bit with the added function of being a mounting apparatus for use with an electronic device having camera and/or video capability. The multi-purpose card may have multiple suction cup slots cut in a raindrop shape, each interior slot opening for receiving a mini double sided suction cup; and wherein the stored-value card feature may comprising the presence on the card of a mag-stripe feature, and a barcode and linked serial number, optionally a scratch-off pin code, and/or other financial or information data or date-storage. The card platform may be rigid, with the removably attached mini-double-suction-cups having cups on one side of the card platform to connect to an electronic device, and also cups on the other side of the card platform open and available for suction-connection to a smooth object/surface, in order to hang/suspend the dual-function device (stored-value card and mounting apparatus) and electronic device from said object/surface.

The suction cups are outward-facing from the card with the ability to suction to smooth surfaces. The suction cups may be manually inserted into the raindrop slots to remain in place during the use of the card, and, hence, are also manually removable if the user or a manufacturer desires. The card platform may contain sufficient space to allow integration of the various stored-value card features, as the slots and their suction cup units are preferably grouped to one end or one side for leaving room for the stored-value card features. Certain embodiments may be called a rigid card platform with pre-cut slots in a raindrop shape, or in certain embodiments other elongated shape(s), for receiving the mini double-sided suction cups. The raindrop shape slots (or other elongated slots in certain embodiments) are preferably of a specific size to ensure secure retention of the suction cups during use. Various stored-value features linked to a financial account may be provided on the rigid card platform to allow for traditional stored-value card functionality.

Certain embodiments may be described as an electronic-device suspension system, the system comprising: an elongated hand-held electronic device having a length, a flat smooth touch-screen, and a lens near one end or otherwise provided on a side of the electronic device for taking pictures or video recording; a multi-purpose stored-value card having a rigid card platform, the card platform having a longitudinal axis with raindrop slots sized to receive multiple double-sided suction cups that can removably attach to an electronic device in a horizontal orientation parallel to the longitudinal axis, or removably attach to the electronic device in a vertical orientation perpendicular to the platform so that the electronic device is in portrait configuration. The multiple raindrop shaped slots are preferably pre-cut into the card platform. The multiple mini double sided suction cups are preferably securely inserted into the slots, one side of the cups being for receiving the screen of an electronic device and the other side of the cups being exposed for removably attaching to a smooth vertical surface or object. By connecting the suction cups to the screen of the electronic device, the lens, which is typically on an opposite side of the electronic device, will be exposed for hands-free use while the suspension system holds the electronic device on the vertical surface or object.

Although this invention has been described above with reference to particular means, materials and embodiments, it is to be understood that the invention is not limited to these disclosed particulars, but extends instead to all equivalents within the broad scope of the following claims.

The invention claimed is:

1. A mounting apparatus for an electronic digital device, the mounting apparatus comprising:
    a card having a plurality of apertures, and a plurality of double-suction-cup units connected to the card by extending through the apertures so that a front cup of each cup unit faces forward away from the card and a rear cup of each cup unit faces rearward away from the card, each of the plurality of apertures being elongated for receiving one of either the front cup or the rear cup in a folded configuration for insertion through the aperture; and
    wherein the card comprises at least one identifier selected from a group consisting of:
    an identifier of an amount of stored monetary value selected from a group consisting of a mag-stripe, barcode, serial number, scratch-off pin code, and smart-chip; and
    a financial account identifier selected from the group consisting of a mag-stripe, barcode, serial number, scratch-off pin code, and smart-chip.

2. The apparatus of claim 1, wherein at least one of the plurality of apertures is raindrop-shaped.

3. The apparatus of claim 1, wherein at least one of the plurality of apertures is selected from a group consisting of: raindrop shapes, oval shapes, oblong shapes, and egg-shapes.

4. The apparatus of claim 1, wherein at least one of the plurality of apertures has a rounded portion and a pointed portion opposite the round portion, and wherein said elongation of said at least one of the plurality of apertures is between the rounded portion and the pointed portion.

5. The apparatus of claim 1, wherein the card is removably attached to a stored-value card.

6. The apparatus of claim 1, wherein each double-suction-cup unit is removable from the apertures by pinching the front cup or the rear cup to a folded configuration that is slideable through its respective aperture for removal from the card.

7. The apparatus of claim 1 wherein the apertures and double-suction-cup units are located at one end of the card and the at least one identifier is at an opposite end of the card.

8. The apparatus of claim 1 wherein the apertures and double-suction-cup units are located near one edge of the card and the at least one identifier is near an opposite edge of the card.

9. A system for mounting an electronic digital device, on a surface or object, the system comprising:
   an electronic digital device having a lens for photography or video-recording; and
   a mounting apparatus comprising:
   a card having a plurality of apertures, and a plurality of double-suction-cup units connected to the card by extending through the apertures so that a front cup of each cup unit faces forward away from the card and a rear cup of each cup unit faces rearward away from the card, a plurality of the rear cups being suction-connected to a front face of the electronic digital device so that the lens faces rearward away from the mounting apparatus, and the front cups being suction-connectable to the surface or object for hands-free operation of said photograph or video-recording; and
   wherein the card comprises at least one identifier selected from a group consisting of:
   an identifier of an amount of stored monetary value selected from a group consisting of a mag-stripe, barcode, serial number, scratch-off pin code, and smart-chip; and
   a financial account identifier selected from the group consisting of a mag-stripe, barcode, serial number, scratch-off pin code, and smart-chip.

10. The system of claim 9, wherein each of the plurality of apertures are elongated for receiving one of the front cups or one of the rear cups in a folded configuration for insertion through the aperture.

11. The apparatus of claim 9, wherein at least one of the plurality of apertures is selected from a group consisting of: raindrop shapes, oval shapes, oblong shapes, and egg-shapes.

12. The apparatus of claim 9, wherein the card is removably attached to a stored-value card.

13. The apparatus of claim 9, wherein the apertures and double-suction-cup units are in a location selected from the group consisting of: near one end of the card and the at least one identifier is at an opposite end of the card, near one edge of the card and the at least one identifier is near an opposite edge of the card.

14. The apparatus of claim 9, wherein the electronic digital device is a smartphone and the front face is a touch screen of the smartphone, so that said rear cups are suction-connected to the touch screen.

\* \* \* \* \*